United States Patent
Alexander et al.

(10) Patent No.: US 10,442,255 B2
(45) Date of Patent: Oct. 15, 2019

(54) METHOD FOR ASSIGNING IDENTIFIERS OF WHEEL ELECTRONICS OF A TIRE PRESSURE MONITORING SYSTEM OF A VEHICLE TO THE POSITIONS OF THE WHEELS ON THE VEHICLE

(71) Applicant: Huf Hülsbeck & Fürst Gmbh & Co. KG, Velbert (DE)

(72) Inventors: Markus Alexander, Rheinstetten (DE); Ralf Kessler, Pfinztal (DE); Markus Wagner, Ludwigsburg (DE)

(73) Assignee: HUF BAOLONG ELECTRONICS BRETTEN GMBH, Bretten (DE)

( * ) Notice: Subject to any disclaimer, the term of this patent is extended or adjusted under 35 U.S.C. 154(b) by 58 days.

(21) Appl. No.: 15/921,602

(22) Filed: Mar. 14, 2018

(65) Prior Publication Data

US 2018/0201075 A1    Jul. 19, 2018

Related U.S. Application Data

(63) Continuation of application No. PCT/EP2016/071251, filed on Sep. 9, 2016.

(51) Int. Cl.
*B60C 23/04* (2006.01)
*G07C 5/08* (2006.01)

(52) U.S. Cl.
CPC ...... *B60C 23/0416* (2013.01); *B60C 23/0437* (2013.01); *B60C 23/0488* (2013.01); *G07C 5/085* (2013.01); *G07C 5/0808* (2013.01)

(58) Field of Classification Search
None
See application file for complete search history.

(56) References Cited

U.S. PATENT DOCUMENTS

| | | | |
|---|---|---|---|
| 5,808,190 | A | 9/1998 | Ernst |
| 6,018,993 | A | 2/2000 | Normann et al. |
| 6,181,241 | B1 | 1/2001 | Normann et al. |
| 6,633,229 | B1 | 10/2003 | Normann et al. |
| 8,760,277 | B2 | 6/2014 | Kessler et al. |

(Continued)

FOREIGN PATENT DOCUMENTS

| | | |
|---|---|---|
| DE | 198 56 861 A1 | 6/2000 |
| DE | 10 2009 001 074 A1 | 8/2010 |
| DE | 10 2011 050 636 A1 | 8/2012 |

(Continued)

*Primary Examiner* — Abdhesh K Jha
(74) *Attorney, Agent, or Firm* — Hackler Daghighian Martino & Novak (57) ABSTRACT

A method for assigning identifiers of wheel electronics to the positions of the wheels on the vehicle is disclosed. The wheel electronics send their individual identifier with information relating to the rotational direction of the wheel and to the occurrence of an impact on the wheel to a receiver. An evaluation unit: collects the identifiers and rotational direction information and the driving speed, and on this basis, differentiates between identifiers of wheel electronics on the left and right vehicle side; differentiates impacts reported from wheel electronics on the left vehicle side, from impacts reported from wheel electronics on the right vehicle side; measures the time between impact signals reported from wheel electronics on the left or on the right vehicle side; multiplies the measured time by the driving speed measuring during this time; and checks whether the length formed by the multiplication coincides with an axle distance.

13 Claims, 1 Drawing Sheet

(56) References Cited

U.S. PATENT DOCUMENTS

2012/0194333 A1    8/2012   Kessler et al.

FOREIGN PATENT DOCUMENTS

| EP | 0 806 306 A2 | 11/1997 |
| EP | 0 861 159 A1 | 9/1998 |
| EP | 0 861 160 A1 | 9/1998 |
| WO | 2010/094523 A1 | 8/2010 |

METHOD FOR ASSIGNING IDENTIFIERS OF WHEEL ELECTRONICS OF A TIRE PRESSURE MONITORING SYSTEM OF A VEHICLE TO THE POSITIONS OF THE WHEELS ON THE VEHICLE

CROSS-REFERENCE TO RELATED APPLICATIONS

This continuation application claims priority to PCT/EP2016/071251 filed on Sep. 9, 2016 which has published as WO 2017/046003 A1 and also the German application number 10 2015 115 818.3 filed on Sep. 18, 2015 and German application number 10 2015 122 820.3 filed on Dec. 23, 2015, the entire contents of which are fully incorporated herein with these references.

FIELD OF THE INVENTION

The invention relates to a method for assigning identifiers which are contained in signals, which are transmitted from units of a tire pressure monitoring system to the positions of the wheels of the vehicle at which the units are mounted. The units mounted on the wheels of the vehicle are designated in the following as wheel electronics. Each wheel electronics contains a pressure sensor which responds to the tire pressure of the wheel, and a sensor which responds to impacts, e.g. a sensor responding to radial accelerations. Preferably, the wheel electronics also contain an acceleration sensor, which delivers information relating to the rotation speed of the wheel. In addition, the wheel electronics contain a memory in which the individual identifier of the wheel electronics is stored, and a transmitter, which transmits signals which contain not only the individual identifier but also information relating to the tire pressure, relating to impacts occurring on the wheel, if applicable also relating to the rotation speed of the respective wheel, to a receiver which is provided with or connected to an antenna, provided on the body of the vehicle, and an evaluation unit. The antenna is usually mounted on the underside of the body. It can be connected to the receiver, which decodes the received signals and may also amplify them and/or process them, by means of a cable, or can be integrated with the antenna entirely or partially to form an assembly. The evaluation unit is generally arranged at some distance from the antenna in the engine compartment or in the interior of the vehicle, e.g. behind the instrument panel. The receiver can be integrated with the evaluation unit to form an assembly, or can be realized separately therefrom. Finally, the receiver can also be divided into a portion assigned to the antenna and into a portion assigned to the evaluation unit.

The evaluation unit, sometimes also designated as central unit of the tire pressure monitoring system, evaluates the signals transmitted from the wheel electronics and indicates to the driver anomalies with regard to the tire pressure, for which the evaluation unit is generally connected to a display device provided in the instrument panel of the vehicle. The connections between the evaluation unit and the display device and, if applicable, to the receiver, usually take place via cables, e.g. via a BUS system provided in the vehicle.

So that the evaluation unit can indicate at which wheel an anomaly of the tire pressure occurs, it must know at which wheel a wheel electronics is situated, which is signalling the anomaly of the tire pressure. For this purpose, the wheel electronics transmit in their signals, together with information relating to the tire pressure, the individual identifier, which is usually a series of digits, which clearly characterizes the individual wheel electronics. So that the evaluation unit can assign a series of digits which has been transmitted to it to a particular wheel or respectively to a particular wheel position, it must be previously informed of the identifiers of the wheel electronics installed in the vehicle and their assignment to the wheel positions and these must be stored in the evaluation unit or in a memory connected to the evaluation unit. Assignment methods are known for this.

BACKGROUND OF THE INVENTION

From EP 0 806 306 B1 it is known to provide in the wheel electronics a movement sensor, namely an acceleration sensor, which responds to radial accelerations and/or tangential accelerations occurring at the wheel. Such an acceleration sensor permits not only a differentiation between a resting vehicle and a stationary vehicle, but it also delivers information relating to the rotation speed of the wheel. The radial acceleration and the tangential acceleration of a wheel is superimposed by the gravitational acceleration, the influence of which changes its sign twice on each revolution of the wheel. The reciprocal value of the time span between every two sign changes of the superimposition of the acceleration signal by the gravitational acceleration is proportional to the rotation speed of the wheel.

The method known from EP 0 806 306 B1 compares the rotation speed obtained by the acceleration sensor in the wheel electronics with the rotation speeds which are delivered for the same period of time by ABS sensors on the wheels of the vehicle. If the coinciding of the rotation speed measurement originating from the wheel electronics with a rotation speed measurement originating from an ABS sensor is established, then it is assumed that the ABS sensor and the respective wheel electronics are assigned to the same wheel position, e.g. at the front left on the vehicle. A prerequisite for this, however, is that the rotation speed measurement originating from the wheel electronics coincides with the rotation speed measurement of only one of the ABS sensors. The identifier is than stored under the position of the ABS sensor from which the coinciding rotation speed signal came. In the case of future signals which contain the same identifier, the evaluation unit then knows from which wheel or respectively from which wheel position, e.g. front left, the signal originates.

The known assignment method presupposes that in the rotation speed comparison the wheels have differences in the rotation speed. These differences can have different causes, e.g. slippage between wheel and road surface, different rolling radii as a result of different tire sizes or as a result of different loads or as a result of different tire pressures and in particular as a result of cornering. Wheels on the outer side of a curve always cover a greater path than wheels on the inner side of a curve and therefore rotate more quickly than the wheels on the inner side of the curve. The differences in rotation speed between the wheels of a vehicle can be small, when travelling in a straight line they can even be vanishingly small. EP 0 806 306 B1 therefore requires that two rotation speed values, one of which has been measured by means of the acceleration sensor in a wheel electronics and one of which has been measured by means of an ABS sensor, are only evaluated as being coinciding when they coincide except for disparities which are unavoidable with respect to measurement technology. Only when such a high-grade coincidence is established a single time for only one of the ABS sensors is the identifier of the wheel electronics assigned precisely to the ABS sensor which has delivered the coinciding rotation speed signal. This has the disadvantage that it can take a very long time until the evaluation unit has assigned all the identifiers which it receives respectively to a particular ABS sensor and therefore to a particular wheel position. In addition, the known method is susceptible to erroneous assignments. However, as long as the identifiers of the wheel electronics installed on the vehicle are not correctly assigned to the wheel positions, a reliable tire pressure monitoring is not possible. The method known from EP 0 806 306 B1 has therefore not entered into practice.

From DE 198 56 861 B4 an automatic assignment method is known, which via the evaluation of rotation direction information which is delivered from an acceleration sensor in the respective wheel electronics, and from the received signal levels, enables a definite assignment of the identifiers to the wheel positions. However, this requires the arrangement of the receiving antenna at an eccentrically situated site of the body floor pan as a prerequisite that the signals which are transmitted from the wheel electronics with the same power are received by the receiving antenna with different signal levels. This possibility, which is good per se, for carrying out an assignment method rapidly and reliably, is out of the question, however, if a central position is required for the receiving antenna, at which it can receive signals from all directions in as equally good a manner as possible, e.g. also the signals of a wireless key, which can strike the receiving antenna from any direction.

From EP 0 861 159 B1 it is known to determine the assignment of the identifiers to the different wheel positions solely from the intensity of the signals received from one or more antennae through statistical evaluation of the measured intensities. The disadvantages indicated with regard to DE 19 856 861 B4 also apply to EP 0 861 159 B1. In addition, as a further disadvantage, is that the assignment method lasts all the longer, the fewer receiving antennae are connected to the receiver. With only one receiving antenna, the duration of the assignment method is the longest, and the possibilities for positioning the antenna are very limited, because the antenna must be able to receive signals from all the wheel electronics and the received intensities must differ from one another.

A method having the features of the preamble of claim 1 is known from DE 10 2011 050 636 B4. In this method, the evaluation unit detects the identifiers contained in the received signals, measures the time span between impact signals, which have been received consecutively, multiplies the measured time span with a speed of the vehicle measured in the same time span and reported to the evaluation unit, checks whether the length formed through this multiplication coincides, within a predetermined tolerance, with a given axle distance of the vehicle, assigns, in the event that it coincides, the identifier which was contained in the signal, which contains the information relating to the first of two consecutively detected impacts, to a front of the two axles and assigns the identifier which was contained in the signal, which contains the information relating to the second of the two consecutively detected impacts, to the rear of the two axles, when the signals are received during forward travel.

This method uses only a single antenna for receiving the signals. The determining of an antenna position which is suitable for the method is complicated and is frequently possible only shortly before the start of production of a vehicle series. Wheel electronics which transmit from a position which is unfavorable for the receiver antenna are particularly difficult to assign, their assignment can take a particularly long time.

In order to be able to clearly differentiate between signals which come from front wheels, and signals which come from rear wheels, it is expedient, in a two-axle vehicle, to arrange the receiving antenna close to the front axle or close to the rear axle of the vehicle. In order to be able to differentiate by means of the signal intensity between signals which come from wheels on the right side of the vehicle and signals which come from wheels on the left side of the vehicle, it is expedient to arrange the receiving antenna remote from the vertical longitudinal centre plane of the vehicle. The above-mentioned restrictive specifications for the location of the receiving antenna cannot always be complied with, or can only be imperfectly complied with. This disadvantage is further intensified in that the transmitters of the wheel electronics can have different transmission powers due to manufacturing tolerances, that the tires which are mounted on the vehicle can damp the transmitted signals to a different extent, and that the signals can be shielded to a different extent by components of the vehicle depending on the position of the rotating wheels.

Regardless of these difficulties, there are vehicle manufacturers who require that with each new start of the vehicle the complete assignment method is to run, and namely, for safety reasons, as quickly as possible and with as few transmission processes as possible, in order to shorten as little as possible the lifespan of the battery, arranged in the wheel electronics, through the frequent assignment methods, because the battery cannot normally be replaced.

SUMMARY OF THE INVENTION

It is an object of the present invention to find a solution for the contradictory objectives of the assignment method.

This problem is solved for an assignment method which enables at least a differentiation between front wheels and rear wheels of the vehicle, by a method having the features indicated in claim 1. Advantageous refinements of the invention are the matter of dependent claims.

The method according to the invention has the great advantage that the method known from DE 2011 050 636 B4—which can differentiate by evaluation of impact signals between signals which originate from wheels on a front axle and signals which originate from wheels on a rear axle—can be shortened when, at the same time as the differentiation of signals which originate from wheels on the front axle and signals which originate from wheels on the rear axle, an evaluation of the intensity of the received signals takes place. These two methods, which are known per se, can be shortened in that neither in the evaluation of the signal intensities of the received signals nor in the evaluation of the received impact signals does a waiting occur until the assignment result resulting from the respective method has stabilized itself to such an extent that one would already obtain reliably the correct assignments from each individual one of the two methods, in its own right. Rather, the two assignment methods can already be terminated earlier, namely when in one of the two methods a trend in favor of a particular assignment becomes apparent and in the other method a trend in favor of the same assignment becomes apparent. The trends, becoming apparent in both methods, in favor of the same assignment may indeed not be sufficient individually in their own right, in order to reliably conclude therefrom that the assignment which is becoming apparent is correct, but when in both methods a trend in favor of the same assignment becomes apparent, the likelihood is much greater that a correct assignment is concerned. Therefore, the two assignment methods, running in a chronologically parallel manner, can be shortened and therefore the assignment as a whole can be concluded successfully after a shorter number of transmission processes than in the prior art.

The method coming into use within the invention and forming a part of the invention, in which the signals transmitted from the different wheel electronics are received by a single antenna and the intensity of the received signals is evaluated, is based on the empirical fact that with a predetermined position of the receiving antenna, the signals transmitted from the wheel electronics are received on average with different intensities, so that—when the number of evaluated signals is great enough—one can establish which identifier is to be assigned to which wheel position. The statistical evaluation of the intensities of the received signals can take place for example so that the intensities of the signals registered by the evaluation unit are added under the respective identifier which is contained in the received signal. The greater the number of signals, the intensities of which are added under the associated identifier, the more clearly do differences form in the sums of the intensities, so that these form a ranking order, according to which the identifiers can be assigned empirically to the respective wheel positions. If, for example, it is known empirically that in a two-axle vehicle, signals which come from the left front wheel are received on average with the greatest intensity, that signals which come from the right front wheel are received on average with the second-greatest intensity, that signals which come from the left rear wheel are received on average with the third-greatest intensity, and that signals which come from the right rear wheel are received on average with the least intensity, then this ranking order will form all the more clearly in the sums of the intensities respectively assigned to the individual identifiers, the more signals have been evaluated.

Another possibility consists in that one only registers how frequently a signal has been received with a particular identifier with the highest intensity, how frequently a signal has been received with a particular other identifier with the second highest intensity, how frequently a signal has been received with a particular third identifier with the third-highest intensity, and how frequently a signal has been received with a particular fourth identifier with the lowest intensity. With this simplified evaluation, one can likewise conclude, with the aid of the counter readings assigned respectively to the individual identifiers, which identifier is to be assigned to which wheel position. For further possibilities of statistical evaluation of the registered intensities, reference is to be made to EP 0 861 160 B1.

How clearly in the two methods a trend in favor of a coinciding assignment must become apparent so that a correct assignment can be reliably concluded, depends on the respective type of the vehicle and its tires, on the wheel electronics and on the receiver, and can be determined by tests before the start of the series manufacturing of the vehicle, the carrying out of which tests lies within the capability of the specialist in the art. Thus, for example a series of tests can be carried out in which one begins with a method duration which has been sufficient for a correct assignment for each individual one of the two assignment methods in the prior art. Then one can shorten the method duration gradually and can check in each step whether a trend, apparent in both methods in favor of a coinciding assignment proves to be correct. As soon as it is established for the first time in these tests that the method has no longer led to a correct assignment, it is known that a limit has been reached for the duration of the assignment method which is to be applied, which one must not fall below. When this duration is increased by an increased safety margin, one arrives at a method duration for the assignment which according to the invention is shorter than for the assignment only by means of a known method for impact evaluation or only by means of a known method for evaluation of the intensity of the signals received by the receiving antenna, and which according to the invention nevertheless leads to a correct assignment.

Whether the front axle is the front axle viewed in the direction of travel or whether the rear axle is the front axle viewed in the direction of travel can be derived for example by the position of the manual gearbox of the vehicle and can be reported to the evaluation unit. However, the method can also be carried out so that it is only carried out during the forward travel of the vehicle. In order to ensure this, in this case the shift position of the manual gearbox can also be interrogated by the evaluation unit or reported to the evaluation unit. Alternatively, the output signal of an electronic tachometer can be evaluated, which on reverse travel has a different sign than on forward travel. It is also possible to carry out the method only above a predetermined minimum speed, which is generally not exceeded during reverse travel, for example above 20 km/h. Another possibility consists in providing in the wheel electronics respectively an acceleration sensor responding to tangential accelerations of the wheel, the output signal of which changes its sign on a reversal of the rotation direction. In this case, a differentiation can already be made in the wheel electronics between forward travel and reverse travel and transmission processes can be omitted during reverse travel.

For the differentiation of identifiers which belong to wheel electronics on wheels on the left vehicle side, and identifiers which belong to wheel electronics on wheels on the right vehicle side, a sensor is preferably provided in the wheel electronics which delivers information relating to the rotation direction of the respective wheel and which is transmitted to the receiver in the signal which contains the individual identifier of the respective wheel electronics. In this case, the evaluation unit detects in addition the rotation direction information, differentiates on the basis of the detected rotation direction information between identifiers which belong to wheel electronics on wheels on the left vehicle side, and identifiers which belong to wheel electronics on wheels on the right vehicle side, and differentiates impacts which are reported to it from wheel electronics on the left vehicle side, from impacts which are reported to it from wheel electronics on the right vehicle side. In this way, the method provides not only knowledge as to whether a particular identifier belongs to a wheel on the front axle or on the rear axle, but furthermore also provides the knowledge as to whether this concerns a wheel on the right vehicle side or on the left vehicle side, so that e.g. in the case of a vehicle with four wheels, a wheel position can be clearly assigned to all four identifiers. A spare wheel, which is possibly also carried, can in fact also be equipped with wheel electronics, but does not emit any signals as long as the spare wheel is not rotating.

When two impacts occur simultaneously on two wheels with different rotation direction, then it can be assumed that they originate from a right wheel and a left wheel on a shared axle. Such events can have their cause in changes to the properties of the road surface which extend over the entire width of the traffic lane, such as e.g. changes to the covering of the road surface or expansion joints or steps in the road surface. Simultaneous occurrence is not to be understood here in the strict mathematical sense of "simultaneous", but rather in a practical sense as occurrence in a time span which depends on the speed of travel and e.g. is obtained by dividing a path, which is small compared to the axle distance in the vehicle, by the speed of travel, so that the time span in which an occurrence of two impacts is considered as simultaneous is in any case substantially shorter than the chronological distance in which the unevenness of the road surface brings about two impacts in two wheels which are situated on axles arranged one behind the other.

The unevenness in the road surface, which brings about simultaneously impacts in two wheels on a first axle, will also bring about simultaneous impacts in the following wheels—in relation to the direction of travel—so that the identifiers transmitted with the simultaneously occurring impact signals can be clearly assigned to the axles following one another. By taking into consideration simultaneously occurring impacts on wheels with different rotation direction, the assignment method can consequently be terminated more quickly.

For determining the rotation direction of the wheel, preferably an acceleration sensor is used, in particular an acceleration sensor which responds to tangential accelerations of the wheel. The acceleration component occurring during accelerating or during decelerating of the vehicle in circumferential direction of the wheel is designated here as tangential acceleration. When the wheel electronics are mounted in coinciding installation position on the wheels of the vehicle with respect to the wheel, then the sign of the acceleration signal permits a differentiation between right and left wheels. An acceleration sensor on a wheel on the right side of the vehicle and an acceleration sensor on a wheel on the left side of the vehicle deliver acceleration signals with opposite signs in the case of an accelerated or decelerated vehicle.

The rotation direction of a wheel can, however, also be detected by evaluation of the signals of two acceleration sensors which are mounted in different orientation on the wheel, in particular a sensor responding to radial accelerations and a sensor arranged at right angles thereto, which responds to tangential accelerations. The acceleration sensors can be used at the same time as impact sensors. This applies in particular to the sensor responding to radial accelerations.

As the starting of the vehicle begins with an acceleration phase, it is recommended to establish in the initial acceleration phase which of the identifiers received by the evaluation unit belong to wheels on the left side of the vehicle and which belong to wheels on the right side of the vehicle. Thereafter, it must only be further determined on which axle a wheel is arranged, which emits a particular identifier, in order to be able to assign this identifier to a particular wheel position. Establishing which wheels are situated on the right side and which wheels are situated on the left side of the vehicle requires much less time than bringing the assignment method to an end by evaluating impact signals and signal intensities, so that the differentiation between right and left wheels is not decisive for the duration of the assignment method.

The invention utilizes the fact that unevenness in the road surface over which the vehicle travels are frequently felt only by the wheels on the right vehicle side or by the wheels on the left vehicle side, because only the wheels on the right vehicle side or the wheels on the left vehicle side travel over the unevenness. The wheel electronics therefore have, according to the invention, a sensor which responds to impacts which occur at the respective wheel. An acceleration sensor, in particular an acceleration sensor which responds to radial accelerations of the wheel, is particularly suitable as the sensor which responds to impacts. If, e.g. a left front wheel of a vehicle receives an impact by travelling over an unevenness in the road surface, which is detected and reported by the impact sensor in the wheel electronics of the left front wheel, then it is highly likely that the left rear wheel of the vehicle will shortly thereafter likewise run over the same unevenness in the road surface and will receive an impact, which the impact sensor of the wheel electronics provided at the rear left wheel detects and reports. The time span between the occurrence of the impacts on the front and on the rear wheel is determined by the axle distance between the front wheel and the rear wheel and by the current speed of the vehicle. The time span results from the axle distance, by the latter being divided by the current speed of the vehicle. When a measurement is carried out of the current speed and the time span between the occurrence of an impact signal, which is reported by the wheel electronics of the front wheel, and the occurrence of an impact signal which is reported by the wheel electronics of the rear wheel, and the product of this time span and of the current speed of the vehicle produces precisely the given axle distance of the vehicle, then according to the invention it is concluded therefrom that the two wheels, arranged one behind the other on the same vehicle side, have rolled over the same unevenness in the road surface. It follows therefrom that the first of the two consecutively determined identifiers, which as is known originate from wheels on one and the same vehicle side, is to be assigned to a front axle, whereas the second identifier received at the end of the time span, which originates from a wheel on the same vehicle side, is to be assigned to the axle arranged there behind in the known axle distance. Thereby, the wheel positions which belong to the two received and evaluated identifiers are clearly determined, because the assignment to a particular side of the vehicle was already determined.

In a corresponding manner, the identifiers of the wheel electronics installed on the other side can be clearly assigned to the wheel positions on this other vehicle side.

Advantageously, impacts can also be evaluated, which occur simultaneously on two wheels with different rotation direction on a shared axle, and e.g. are brought about by expansion joints or changes to the road surface covering extending over the entire width of the road surface, and permit a quicker assignment of the identifiers to the individual wheel positions.

An acceleration sensor does not necessarily have to be used in the wheel electronics for the detecting of the impacts. As impacts occurring on the wheel also lead to pressure surges in the air enclosed by the tire, the impacts can also be detected by the pressure sensor which is present in the wheel electronics. The impact detection by means of an acceleration sensor is, however, preferred and consumes less energy.

The assignment method is also suitable for vehicles with more than two axles, because also in this case every two axles have a known axle distance, by means of which the assignment of the identifiers to the wheel positions can take place clearly, as in the case of a two-axle vehicle, from the vehicle speed and from the time span between two impact signals which have occurred on the same vehicle side.

In so far as two pairs of twin wheels are arranged on an axle of the vehicle, the assignment of the identifiers to the wheel positions can likewise take place by the method according to the invention, because in this case nothing different applies for the differentiation of wheels on the right side and wheels on the left side of the vehicle. For the evaluation of the impact signals delivered by the impact sensors, one can assume that impact signals which originate from a wheel electronics mounted on a front wheel with the two twin wheels arranged behind in the axle distance on the same side of the vehicle lead with different frequency to impact signals. Of the two twin wheels, the wheel which is arranged in the track of the front wheel—and normally that is the outer of the two wheels—will receive from the same unevenness in the road surface, which has subjected the front wheel to an impact, will with greater likelihood receive an impact than the second wheel of the twin which is arranged further inside. On this basis, a differentiation can be made between the two twin wheels which are arranged on the same vehicle side from the frequency of the occurrence of the impact signals.

In the checking whether the length, which is obtained by multiplication of the vehicle speed with the time span between impact signals which were reported consecutively from wheel electronics on the left vehicle side or respectively from wheel electronics on the right vehicle side, coincides with a given axle distance of the vehicle, expediently a check is not made as to whether the determined length coincides precisely with the given axle distance. Instead, it is sufficient to check whether the determined length coincides, within a predetermined tolerance, with a given axle distance of the vehicle. Which deviation of the determined length from the given axle distance is tolerable can be determined by tests. If the tolerance is selected too small, in many cases the lengths determined from impact signals which are obtained on a shared vehicle side on wheels which are arranged one behind the other will not coincide with the closely tolerated axle distance, so that the assignment method will last an unnecessarily long time. If the tolerance is selected too large, then an erroneous assignment can occur, if impact signals which are actually not correlated to one another determine the assignment.

A sufficient reliability of the assignment method according to the invention is achieved by the assignments being repeatedly formed and statistically evaluated. For this purpose, the assignments which occur the most frequently can be selected and stored in a memory which is provided in the evaluation unit or in connection with the evaluation unit. The more impact signals are evaluated, the more clearly will a trend form in favor of the correct assignments compared to the erroneous assignments.

Mathematically, the statistical evaluation can be carried out so that in the evaluation unit a matrix is formed, in which for each possible pair of a wheel position and an identifier a field is provided, on which an assignment, determined for the respective pair, is entered as a match with the value "1" and is increased by "1" with each further match. As soon as a trend to a coinciding assignment of an identifier to a particular wheel position has formed both in the evaluation of impact signals and also in the evaluation of the intensities of the signals received by the evaluation unit, this assignment can be stored as being correct and the assignment method for this particular identifier can be terminated. When, in this way, all identifiers are respectively assigned to one of the available wheel positions, then the assignment method as a whole is terminated. Signals which are emitted thereafter from the wheel electronics during the tire pressure monitoring are assigned to the wheel position which is stored under the identifier obtained in the signal. This assignment is maintained until it is replaced by an amended assignment. It is expedient to carry out the assignment method according to the invention anew every time the vehicle is started anew. Expediently, the deviating assignments are stored in place of the assignments stored hitherto only when the renewed assignment method has led to a deviating assignment.

The method according to the invention has essential advantages:

The method permits an automatic and reliable assignment of the wheel electronics to the respective wheel positions more quickly and with fewer transmissions of the wheel electronics than hitherto in the prior art.

The method can be carried out without special technical effort. Wheel electronics are already generally equipped today with acceleration sensors which respond to a tangential acceleration and/or to a radial acceleration of the wheel. These can be separate sensors, but can also be a so-called multi-axle acceleration sensor, which can establish both tangential accelerations and also radial accelerations.

The information relating to the vehicle speed, necessary for the evaluation of the impact signals, is always available in a road vehicle. Present-day tachometers deliver an electrical speed signal which can be fed e.g. via a BUS system to the evaluation unit which is provided according to the invention.

The impact signals which occur are relatively slow signals. After their reception they can be readily transmitted via an inexpensive BUS system designed for slow signals, which is largely conventional in present-day vehicles.

The method according to the invention does not require any particular position for the antenna by which the signals emitted from the wheel electronics are received. Therefore, an antenna can be used which is utilized at the same time for another radio system, e.g. an antenna arranged on the underbody of the vehicle, which can receive radio signals emitted from a wireless key of the vehicle.

A laborious comparison of the signals used for the assignment method with the signals of an ABS system, which is necessary in the assignment method proposed in EP 0 806 306 B1, is not required according to the invention.

No separate evaluation apparatus is required for the method according to the invention, rather the evaluation can be carried out in an on-board computer or control unit which is present in any case in the vehicle and which has a computing unit, e.g. a microprocessor.

The check as to whether the length, which results through multiplication of the speed of the vehicle with the time span between impacts which were reported consecutively from wheel electronics on one and the same vehicle side, coincides within a predetermined tolerance with a given axle distance of the vehicle, can take place e.g. as follows: Every time when the evaluation unit detects an impact signal, a time window is opened by the evaluation unit, the start and end of which are established taking into consideration the measured vehicle speed, so that the identifier in a subsequent signal, which occurs in the open time window, is assigned to a wheel or respectively to a wheel position which is arranged in the given axle distance from a wheel arranged further forward, preferably on the same vehicle side. There is assigned to the position of the wheel arranged further forward, from which the previous impact signal came, the identifier contained in this previous impact signal. In this embodiment of the assignment method, the breadth of the time window corresponds to the tolerance within which the length, formed by multiplication of the time span which indicates the breadth of the time window with the speed of the vehicle, would coincide with the given axle distance of the vehicle.

Expediently, the output signal of an electric or electronic tachometer is delivered constantly to the evaluation unit during travel. Preferably, a digital output signal of the tachometer is delivered directly to the evaluation unit. The evaluation unit can access the output signal of the tachometer at any time, as required. However, the current speed of the vehicle does not necessarily have to be delivered by the tachometer of the vehicle. It can also be derived e.g. from the wheel rotation speed, which is delivered either from an ABS sensor on one of the wheels or from an acceleration sensor in a wheel electronics. A GPS receiver can also be used for determining the vehicle speed.

Preferably, the method is carried out so that in the wheel electronics a check is made as to whether the amplitude of an impact signal which is formed by the impact sensor as response to an impact exceeds a given threshold value. If—as preferred—an acceleration sensor is used as impact sensor, a check is carried out as to whether the measured acceleration exceeds a given threshold value. Only when the amplitude of the impact signal, in the case of an acceleration sensor the amplitude of an acceleration signal, exceeds the given threshold value and the assignment method is not yet completed, is the transmitter in the wheel electronics caused to immediately emit a signal which contains the necessary information relating to the impact, the identifier and preferably also relating to the rotation direction of the wheel. In this way, the sensitivity of the impact sensor can be adapted automatically to the conditions of the road surface, by the threshold in the case of a bumpy road surface being set higher than in the case of a smooth road surface. This has the advantage that unnecessary transmission processes, which are at the cost of the lifespan of a battery provided in the wheel electronics, are avoided and that the assignment method runs particularly reliably, because it concentrates primarily on the evaluation of distinctly occurring impacts which are correlated in pairs. The decision as to when signals are emitted, which signal an anomalous tire pressure, is to be made independently of the decision as to which of the impact signals detected in the wheel electronics are to be transmitted and which not. The decision as to when and how anomalous pressures are signalled is, as known per se, made according to different criteria, e.g. the falling below or exceeding of predetermined pressure thresholds and the exceeding of predetermined limited values of the speed at which a pressure changes.

The threshold value of the intensity of an impact signal, at the exceeding of which in the wheel electronics a transmission process is to be triggered, does not have to be rigidly predetermined, but rather is preferably variable. When no impact signals are transmitted for a lengthy period of time, this can be evaluated as an indication that the threshold value was selected too high. When, however, impact signals are transmitted too frequently and they too frequently cannot be correlated with a given axle distance in the vehicle, e.g. because the impact signals are noisy, then this is a sign that the threshold value was selected too low. In both cases, this gives cause to adapt the threshold value.

With the use of a sensor responding to radial accelerations as impact sensor, preferably a value in the range of 2 g to 4 g is used as threshold value (g stands for the gravitational acceleration). Thereby, it can be ensured that weak impacts, which would lead to noisy signals, remain disregarded and that a sufficient number of impact signals are transmitted which can be evaluated well. When no impact signals which can be evaluated well occur in periods of a few minutes, this gives cause to change the set threshold value. This can take place autonomously in the wheel electronics; when the wheel electronics can receive control signals brought about by the evaluation unit, which have a different carrier frequency, e.g. 120 kHz, than the signals emitted from the wheel electronics, then the threshold value can also be changed by means of control signals which are brought about by the evaluation unit.

When even with a threshold which is set low no impact signals are transmitted for a lengthy period of time, e.g. for a few minutes, this can be an indication that the road surface is too smooth in order to deliver impacts which are able to be evaluated. In this case, it is advantageous to switch off the impact sensor for some time, in order to save electricity, until the vehicle is moving again on a road surface with greater unevenness. The switching off can take place for particular time segments, e.g. for respectively one minute, in order to thereafter check anew whether impact signals can be obtained which are able to be utilized.

DETAILED DESCRIPTION OF THE PREFERRED EMBODIMENTS

Figure 1:
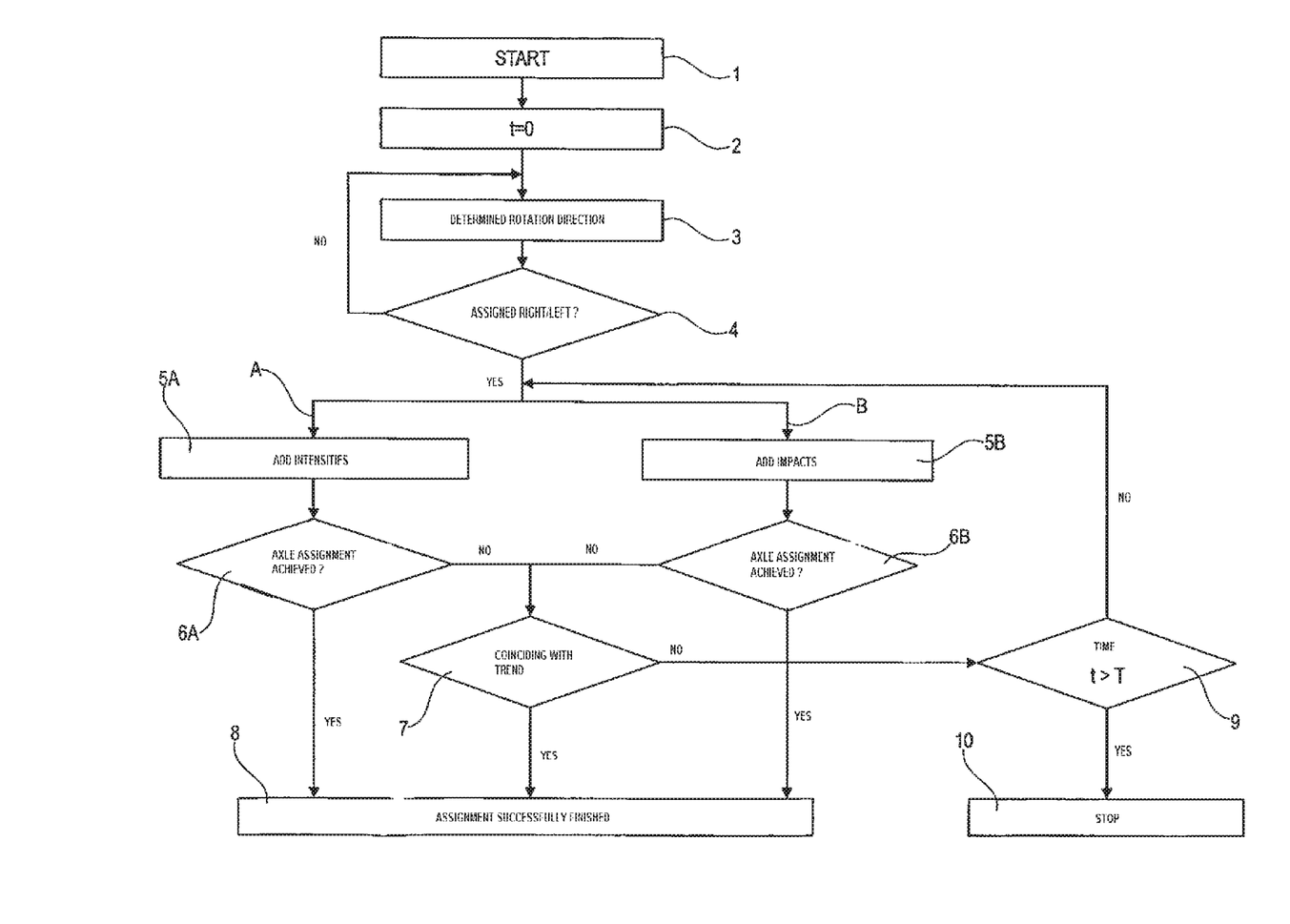
FIG. 1 is an example of an embodiment of the present invention described with the aid of the attached flow chart for a vehicle with four wheels and two axles.

In a first Step 1 the method according to the invention is started, e.g. whenever the vehicle has not been moved for a predetermined time span and thereafter a speed of e.g. 20 km/h has been exceeded, which the tachometer of the vehicle can report to the evaluation unit.

In a second Step 2 a timer in the evaluation unit is started (t=0), which is to terminate the assignment method at the latest after a predetermined time span T.

The fact that the vehicle is moved and exceeds a speed of 20 km/h is also detected by the acceleration sensors in the wheel electronics and these cause them to transmit the sign of the acceleration and thereby the rotation direction of the respective wheel wirelessly to the receiver of the evaluation unit, which derives therefrom in a third Step 3 which identifiers belong to wheel electronics on wheels on the left side of the vehicle and which identifiers belong to wheel electronics on wheels on the right side of the vehicle.

In a fourth Step 4 an enquiry is made as to whether each of the four wheels is assigned to one side of the vehicle, either left or right. When this is not yet the case, the method jumps back to the third Step 3. As soon as each wheel is assigned to one of the two vehicle sides, the assignment method branches into two branches A and B. In branch A, in a Step 5A in a predetermined time span $\Delta t < T$ the intensities of the signals (radio telegrams) transmitted from the different wheel electronics are detected and respectively added under the identifier which is also transmitted in the signals. In branch 5B, chronologically parallel thereto in the predetermined time span $\Delta t$ the impact events reported with the signals (radio telegrams) coming from the wheel electronics are detected in the evaluation unit and are counted under the identifier which is also transmitted in the signals.

After the predetermined time span $\Delta t$ has elapsed, in a Step 6A for signals which have come from wheel electronics on wheels on the left vehicle side and separately for the signals which have come from wheel electronics on wheels on the right vehicle side, respectively the difference of the intensities is formed, added and stored under the two identifiers assigned to the right vehicle side and under the two identifiers assigned to the left vehicle side. If for the wheel electronics which are mounted on the left vehicle side the difference is great enough to thereupon be able to reliably differentiate which of the two wheel electronics is mounted on the front left wheel and which is mounted on the rear left wheel, then in Step 9 for the wheel electronics which are mounted on wheels of the left vehicle side the thus determined assignment is stored and the assignment method is in this respect terminated.

For the wheel electronics which are mounted on the wheels on the right side of the vehicle, the procedure occurs accordingly.

In branch B of the method, the procedure occurs accordingly as in branch A. The methods in branches A and B run chronologically in parallel. If e.g. for the two wheel on the left vehicle side the number of detected impact events which were received in the applicable time interval dependent on the speed with different identifier is sufficient in order to be able to conclude therefrom with certainty which identifier is to be assigned to the left front wheel and which is to be assigned to the left rear wheel, then this assignment is stored, whereby the two identifiers which belong to wheels on the left vehicle side are correctly assigned and the method for the left wheels is terminated.

For identifiers which are mounted on wheels on the right vehicle side, the procedure occurs accordingly.

If, however, a clear assignment is not possible either in the case of the checking in Step 6A or in the case of the checking in Step 6B, then in a Step 7 a check is carried out as to whether the evaluations of the intensity and of the impact events achieved after the time span Δt in Steps 6A and 6B at least indicate a coinciding trend in favor of a particular assignment. If this is the case, the method is terminated with the storing of the assignment resulting from the coinciding trend in Step 8 with the storing of the assignment.

If, however in Step 7 no clear trend in favor of a coinciding assignment is yet apparent, the method jumps back to Steps 5A and 5B and runs through the branches A and B a further time. This is repeated until a clear trend in favor of a particular assignment to the identifiers has formed for the wheel electronics on the right and on the left vehicle side in Step 7. When this does not lead to success over a greater time span T, e.g. because no impact events are registered, the method can be temporarily stopped, after exceeding the predetermined time span T, in Step 10, and started anew at a later point in time. The exceeding of the time span T is established in Step 9.

What is claimed is:

1. A method for assigning identifiers to positions of wheels of a vehicle having at least two axles, wherein said identifiers are contained in signals which are emitted by wheel electronics of a tire pressure monitoring system of the vehicle, which wheel electronics are mounted on the wheels of the vehicle on which the vehicle travels, wherein the method is carried out for the wheels on the right side of the vehicle separately from the wheels on the left side of the vehicle, the method comprising the steps of:

(a) providing the wheel electronics, each wheel electronic comprising:
sensing, by a plurality of sensors, one of which responds to a tire pressure of the wheel and another responds to impacts which occur on the wheel;
storing, using a memory, in which the individual identifier of the respective wheel electronics is stored; and
transmitting, by a transmitter, which transmits signals which contain not only the individual identifier of the respective wheel electronics but also information relating to the occurrence of an impact on the same wheel, to a receiver which is provided or connected with an antenna and with an evaluation unit, to which in addition a speed signal is delivered, which indicates the speed of travel;

(b) detecting, by the evaluation unit, the identifiers contained in the signals;

(c) measuring, by the evaluation unit, the time span between impact signals which are received consecutively;

(d) multiplying, by the evaluation unit, the measured time span with a speed of the vehicle, measured in the same time span and reported to the evaluation unit;

(e) comparing, by the evaluation unit, the length formed through this multiplication with a given distance of two axles of the vehicle;

(f) wherein when the length within a predetermined tolerance coincides with the given axle distance, the evaluation unit assigns the identifier which was contained in the signal, which contains the information relating to the first of two consecutively detected impacts, to the front axle viewed in the direction of travel, and assigns the identifier which was contained in the signal, which contains the information relating to the second of the two consecutively detected impacts, to the rear axle viewed in the direction of travel, and counts for each identifier the assignments to the front axle separately from the assignments to the rear axle, simultaneously or chronologically overlapping with the steps (b) to (f);

(g) measuring, by the evaluation unit, an intensity of the signals received by it;

(h) comparing, by the evaluation unit, the intensities of signals which are received consecutively and differ from one other with regard to their identifier;

(i) assigning, by the evaluation unit, the identifier of the signal which has the higher intensity, as a result of the comparison, to the axle on which the wheel with the higher intensity wheel electronics is situated, for the signal of which, owing to the given arrangement of the antenna of the receiver and with the same transmission power of the wheel electronics, the likelihood is greater that the received signal with the higher intensity originates from the wheel electronics arranged on it than from a-wheel electronics arranged on the other axle;

(j) counting, by the evaluation unit, for each identifier the assignments to the front axle, derived from the comparison of the intensities, separately from the assignments to the rear axle;

(k) comparing, by the evaluation unit, for each identifier the frequency of the assignment to a particular axle and namely both for the assignments determined in step (f) and also for the assignments determined in step (j); (1) wherein when in both steps (f) and (j) a trend has formed in favor of one of the assignments, this assignment of an identifier to a particular axle is stored and the method is continued for the other identifiers.

2. The method according to claim 1, further comprising the steps of: (m) providing a sensor in the wheel electronics delivering information relating to a rotation direction of the respective wheel, which is transmitted to the receiver in the signal which contains the individual identifier of the respective wheel electronics; and (n) detecting, by the evaluation unit, the rotation direction information, differentiating on the basis of the detected rotation direction information between identifiers which belong to wheel electronics on wheels on the left vehicle side and identifiers which belong to wheel electronics on wheels on the right vehicle side, and differentiating on this basis impacts which are reported to it from wheel electronics on the left vehicle side from impacts which are reported to it from wheel electronics on the right vehicle side.

3. The method according to claim 2, wherein each time the evaluation unit detects an impact signal, a time window is opened by the evaluation unit, the start and end of which are formed taking into consideration a measured vehicle speed, so that the identifier in a subsequent impact signal, which originates from a wheel on the same vehicle side and occurs in the open time window, is assigned to a wheel which is arranged on the same vehicle side in the given axle distance from a wheel arranged further forward on the same vehicle side, to which the identifier, contained in the impact signal which came previously from a wheel electronics arranged on the same vehicle side, is assigned.

4. The method according to claim 1, wherein when the evaluation unit detects two impact signals simultaneously, which indicate that they originate from two wheels with different rotation direction, the identifiers transmitted with the two impact signals are assigned to two wheels on a shared axle.

5. The method according to claim 1, wherein a digital output signal of an electric or electronic tachometer of the vehicle is delivered constantly to the evaluation unit during travel.

6. The method according to claim 1, wherein the assignments are repeatedly formed and statistically evaluated, by assignments which noticeably occur frequently being selected and stored in the memory which is provided in the evaluation unit or in connection with the evaluation unit, and that the assignment method is terminated when the assignments are stored for all received identifiers.

7. The method according to claim 1, wherein for determining the rotation direction of the wheel, an acceleration sensor is used that responds to tangential accelerations of the wheel.

8. The method according to claim 1, wherein the sensor which responds to impacts is an acceleration sensor which responds to radial accelerations of the wheel.

9. The method according to claim 1, wherein in the wheel electronics a check is carried out as to whether the intensity of the impact signal delivered from the impact sensor exceeds a given threshold value and that only when this is the case is the transmitter of the wheel electronics caused to immediately emit a signal, in so far as the assignment method is not terminated.

10. The method according to claim 9, wherein the threshold value is reduced when no impact signals are transmitted for a lengthy period of time, and that the threshold value is increased when the transmitted impact signals are frequently not correlated with an axle distance present in the vehicle.

11. The method according to claim 10, wherein when also with a reduced threshold value no impact signals are transmitted from the wheel electronics for a period of predetermined minutes, the impact sensors are switched off for a defined duration.

12. The method according to claim 1, wherein further impact sensors are arranged on shock absorbers or wheel suspensions or springs of the vehicle, and only such impact signals are evaluated which are transmitted simultaneously from one of the further impact sensors.

13. The method according to claim 12, wherein only such impact signals are evaluated which are transmitted simultaneously by wire from the further impact sensors and wirelessly from the wheel electronics.

* * * * *

UNITED STATES PATENT AND TRADEMARK OFFICE
CERTIFICATE OF CORRECTION

PATENT NO. : 10,442,255 B2  
APPLICATION NO. : 15/921602  
DATED : October 15, 2019  
INVENTOR(S) : Markus Alexander, Ralf Kessler and Markus Wagner

Page 1 of 1

It is certified that error appears in the above-identified patent and that said Letters Patent is hereby corrected as shown below:

On the Title Page

Column 1, after the Related U.S. Application Data, insert:  
Item --(30) Foreign Application Priority Data  
Sep. 18, 2015 (DE) ...... 10 2015 115 818.3  
Dec. 23, 2015 (DE) ...... 10 2015 122 820.3--

Signed and Sealed this  
Seventeenth Day of December, 2019

Andrei Iancu  
*Director of the United States Patent and Trademark Office*